(12) United States Patent
Yamada et al.

(10) Patent No.: US 7,142,771 B2
(45) Date of Patent: Nov. 28, 2006

(54) METHOD OF AND APPARATUS FOR EXPANDING MODE FIELD DIAMETER OF OPTICAL FIBER

(75) Inventors: Eiichiro Yamada, Yokohama (JP); Kazuhito Saito, Yokohama (JP); Mitsuaki Tamura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 228 days.

(21) Appl. No.: 10/383,751

(22) Filed: Mar. 10, 2003

(65) Prior Publication Data

US 2004/0017987 A1    Jan. 29, 2004

(30) Foreign Application Priority Data

Mar. 12, 2002  (JP)  ............................. 2002-067686
Nov. 12, 2002  (JP)  ............................. 2002-328144

(51) Int. Cl.
  *G02B 6/16*    (2006.01)
  *G02B 6/18*    (2006.01)

(52) U.S. Cl. .................. 385/147; 385/124; 385/147

(58) Field of Classification Search ............. 385/123, 385/124, 147, 96; 428/369, 373; 264/555; 65/385
See application file for complete search history.

(56) References Cited

U.S. PATENT DOCUMENTS

| 5,098,459 | A | 3/1992 | Fukuma et al. | |
| 6,242,049 | B1 * | 6/2001 | McCarty et al. | 427/446 |
| 6,245,282 | B1 * | 6/2001 | Baker et al. | 264/555 |
| 6,391,444 | B1 * | 5/2002 | Kielmeyer | 428/373 |

FOREIGN PATENT DOCUMENTS

| EP | 1 063 544 A2 | 12/2000 | | |
| EP | 1063544 | * 12/2000 | ............. | 385/93 |
| EP | 1 184 693 A2 | 3/2002 | | |
| EP | 1 296 164 A2 | 3/2003 | | |
| EP | 1 063 544 A3 | 6/2003 | | |
| EP | 1 184 693 A3 | 8/2003 | | |
| EP | 1 296 164 A3 | 4/2004 | | |
| JP | 61-117508 | 6/1986 | | |
| JP | 2-24607 | 1/1990 | | |
| JP | 03-203706 | 9/1991 | | |
| JP | 4260007 | * 9/1992 | ............. | 385/93 |
| JP | 8-75946 | 3/1996 | | |
| JP | 8-82721 | 3/1996 | | |
| JP | 2618500 | 3/1997 | | |
| JP | 2693649 | 9/1997 | | |
| JP | 2001-4865 | 1/2001 | | |
| JP | 2001-122635 | 8/2001 | | |
| JP | 2001-512414 | 8/2001 | | |
| JP | 2001-343549 | 12/2001 | | |
| JP | 4865 | * 12/2001 | ............. | 385/93 |

* cited by examiner

*Primary Examiner*—Akm Enayet Ullah
(74) *Attorney, Agent, or Firm*—McDermott Will & Emery LLP

(57) ABSTRACT

A method of and an apparatus for expanding the mode field diameter of an optical fiber by heating a specified region of the optical fiber with a uniform or desired temperature distribution for forming a thermally-diffused expanded core (TEC). The mode field diameter of the optical fiber is expanded by heating an optical fiber 1 with a burner 11 so as to thermally diffuse the dopant forming the refractive-index profile. The burner 11 has a heating surface 11a in which a plurality of gas-issuing holes 12 are arranged such that a plurality of parallel rows each of which is composed of a plurality of gas-issuing holes 12 are parallel to the axis of the optical fiber 1.

12 Claims, 13 Drawing Sheets

FIG. 3A1
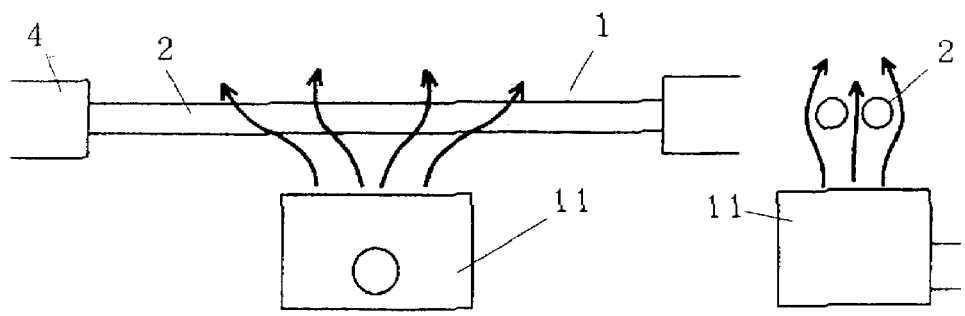
FIG. 3A2
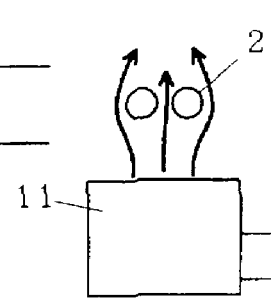
FIG. 3B
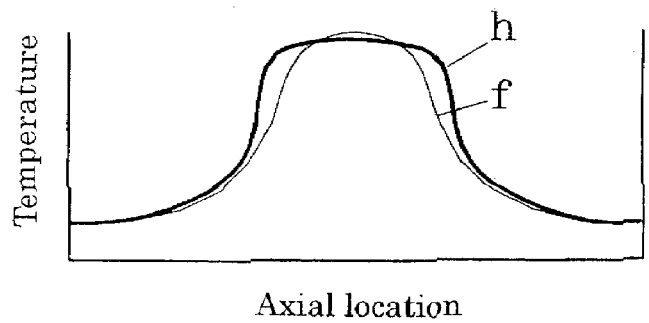
FIG. 4A
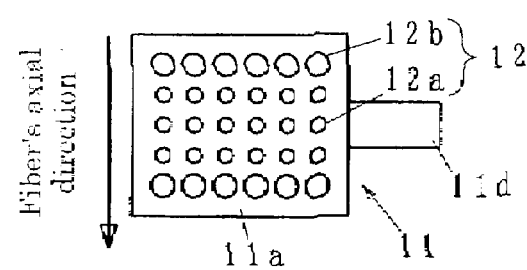
FIG. 4B
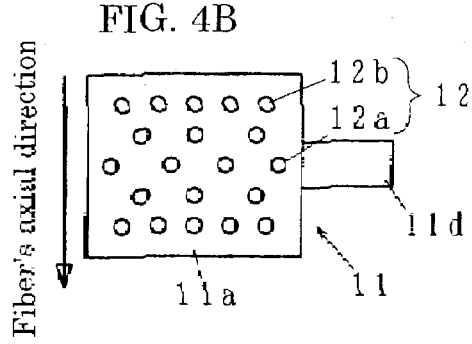
FIG. 4C1
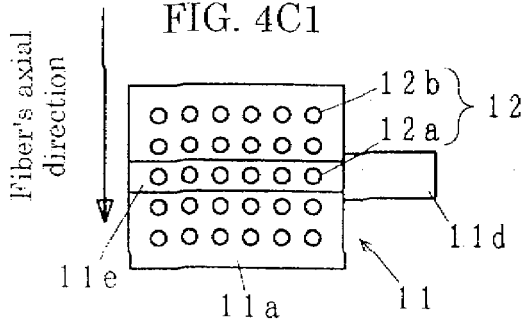
FIG. 4C2   FIG. 4C3
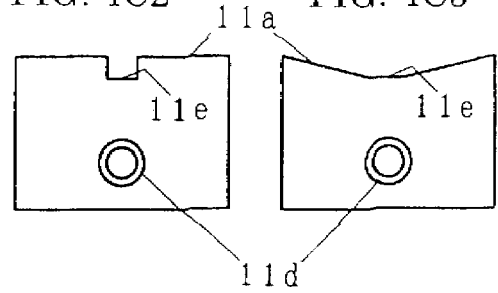

FIG. 5A
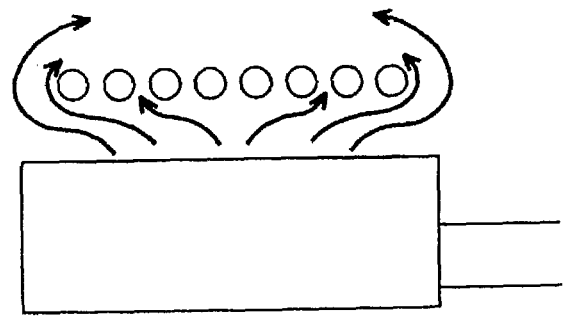
FIG. 5B
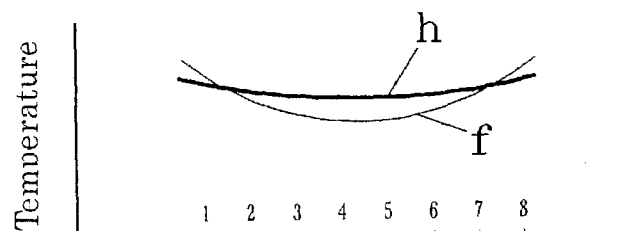
Location of arranged fibers
FIG. 6A
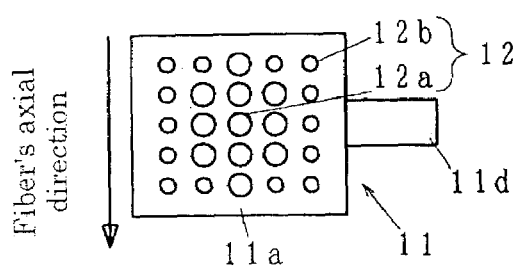
FIG. 6B
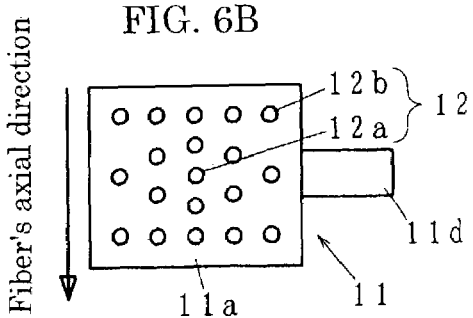
FIG. 6C1
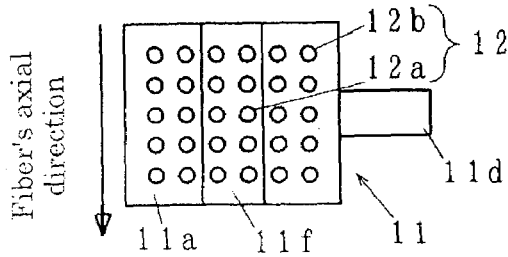
FIG. 6C2
FIG. 6C3
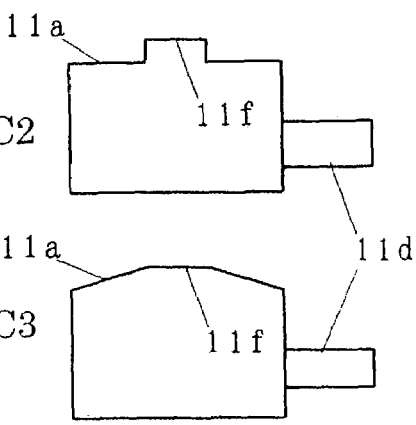

FIG. 12A1
PRIOR ART
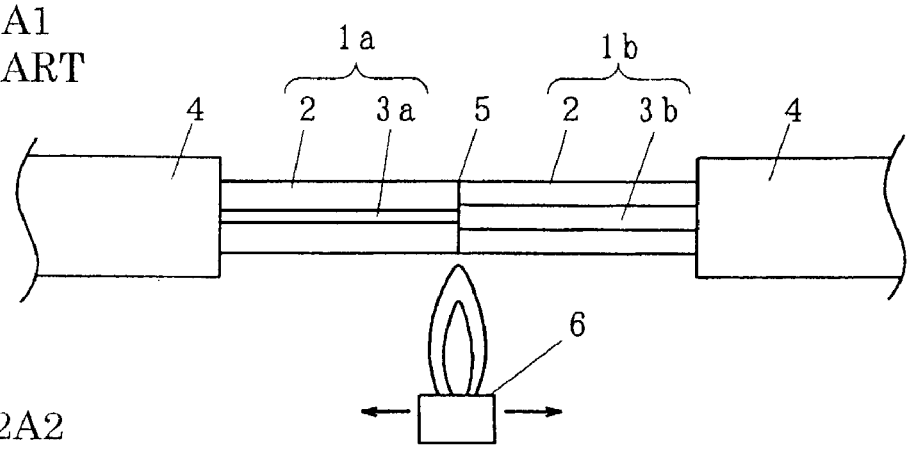
FIG. 12A2
PRIOR ART
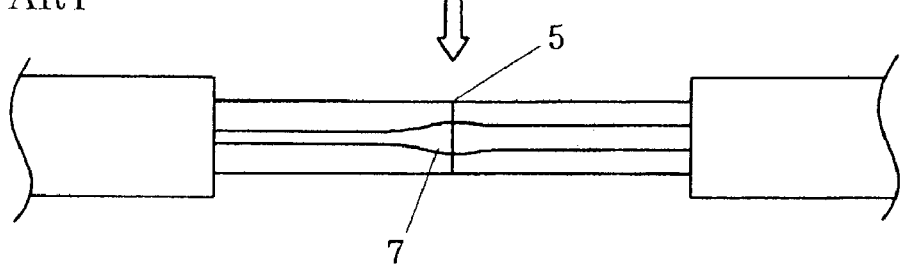
FIG. 12B1
PRIOR ART
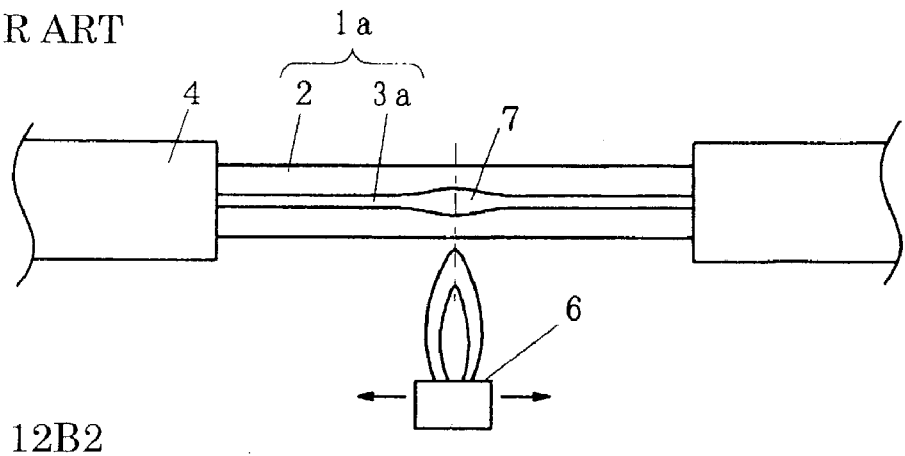
FIG. 12B2
PRIOR ART
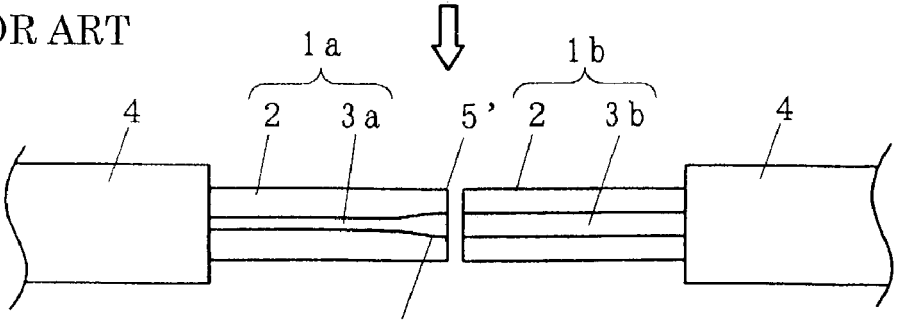

METHOD OF AND APPARATUS FOR EXPANDING MODE FIELD DIAMETER OF OPTICAL FIBER

BACKGROUND OF THE INVENTION

1. Field of the Invention

The present invention relates to a method of and an apparatus for expanding the mode field diameter of an optical fiber by heating the optical fiber with a burner to thermally diffuse the dopant that forms the refractive-index profile.

2. Description of the Background Art

In recent years, researchers and engineers have been developing an optical fiber transmission line in which an optical fiber having a small mode field diameter, such as an optical fiber for wavelength division multiplexing transmission or an optical fiber for Raman amplification, is coupled with an ordinary single-mode optical fiber having a relatively large mode field diameter. When optical fibers having different mode-field diameters are spliced, it is difficult to reduce the splice loss to a practical level only by a simple fusion-splicing method. To solve this problem, Japanese patent No. 2618500 has disclosed a method in which a fusion-spliced portion is additionally heated to thermally diffuse the dopant in the core portion toward the cladding portion. This method can produce a fusion-spliced portion in which the mode field diameter of at least one optical fiber is gradually varied so that the optical fibers can be spliced with the same mode field diameter. Hereinafter, this fusion-spliced portion is referred to as a thermally-diffused expanded core (TEC).

FIGS. 12A1, 12A2, 12B1, and 12B2 are diagrams showing examples for forming a TEC. FIGS. 12A1 and 12A2 are diagrams showing an example in which a TEC is formed after two optical fibers having different mode field diameters are fusion-spliced. FIGS. 12B1 and 12B2 are diagrams showing an example in which a TEC is formed in an optical fiber having a smaller mode field diameter before the optical fibers are fusion-spliced.

In these figures, optical fibers 1a and 1b to be fusion-spliced have cladding portions 2 having the same diameter and core portions 3a and 3b having different mode field diameters and different relative refractive-index differences. The optical fibers 1a and 1b have resin jackets 4. The optical fibers 1a and 1b are butt-fusion-spliced by fusing the mutually facing ends of the optical fibers by using arc discharge or another means. If they are spliced only by a simple fusion-splicing method, the optical fibers 1a and 1b cannot be spliced with the same mode field diameter, and therefore the splice loss increases.

To solve this problem, as shown in FIG. 12A1, a TEC is formed by additionally heating the fusion-spliced portion 5 including its neighboring portions with a microtorch or burner 6 fed with fuel gas. The heating is performed under temperature and time conditions that thermally diffuse the dopant, which is added into the core portions 3a and 3b to increase the refractive index, toward the cladding portions 2 without fusing the optical fibers 1a and 1b. As shown in FIG. 12A2, the heating expands the mode field diameters to form an expanded portion 7 in which the mode fields can be smoothly spliced.

The optical fiber 1a having a smaller mode field diameter and a higher dopant concentration allows the dopant to thermally diffuse more than the dopant in the optical fiber 1b having a larger mode field diameter and a lower dopant concentration. Consequently, the mode field diameter in the optical fiber 1a is expanded more than that in the optical fiber 1b, reducing the discrepancy between the two mode field diameters. As explained above, it is known that when different types of optical fibers are fusion-spliced, the splice loss can be reduced by forming a TEC in which a smaller mode field diameter is expanded such that it closely approximates the mode field diameter of the other optical fiber.

In the case of the other example, as shown in FIG. 12B1, first, the central portion of an optical fiber 1a having a smaller mode field diameter is heated to expand the mode field diameter so that an expanded portion 7 can be formed. Second, the expanded portion 7 is cut to obtain a splicing end face 5' having the same mode field diameter as that of an optical fiber 1b to be spliced. Under this condition, the optical fibers are spliced as shown in FIG. 12B2. This example, also, can prevent an increase in splice loss resulting from the unsmooth splicing caused by a discrepancy in mode field diameter. The published Japanese patent application Tokukaishou 61-117508 has disclosed that the formation of such a TEC is effective even for splicing optical fibers having the same design feature, because the TEC can reduce the splice loss caused by core eccentricity.

The foregoing TEC is formed usually by using a microtorch or a burner. A specified region of an optical fiber is heated by giving the microtorch longitudinal movements relative to the optical fiber. Alternatively, a plurality of microtorches or burners may be placed along the optical fiber. The published Japanese patent application Tokukaihei 8-82721 has disclosed another method in which a plurality of optical fibers arranged in a flat array are concurrently heated by using a plurality of microtorches or burners arranged in the arrayed direction of the optical fibers. Tokukaihei 8-82721 has also disclosed a method in which a fiber ribbon is heated by using a microtorch specifically designed to correspond to the width of the fiber ribbon.

It is necessary to form a TEC by heating the optical fiber under proper temperature and time conditions. The optical fibers 1a and 1b are heated at a temperature below their melting points. Nevertheless, if the heating is not properly conducted, the heated portion is softened and may bend due to the weight of the optical fiber itself. If bending occurs and remains, it increases the splice loss. In addition, it is difficult to control the heating condition when a burner is used, because the flame of a burner has a specific temperature distribution and wanders according to the variation in environmental condition.

Sometimes, a plurality of TECs are formed at fusion-spliced portions after the individual fibers of a fiber ribbon comprising 8, 12, 24, or more fibers are collectively fusion-spliced. In this case, the flames of the burner heat the fusion-spliced portions such that the flames engulf the multiple optical fibers arranged in a flat array. Consequently, the outer fibers in the array are more intensely heated than the inner fibers. In other words, the optical fibers in the array are not uniformly heated. As a result, the TECs are not uniformly formed. This creates a problem in that the splice losses in the individual optical fibers are not uniformly reduced.

The above-described phenomena in the formation of a TEC or TECs are significantly affected by the structure of the heating burner used. However, conventional burners have difficulties in controlling the conditions for properly heating a specified region of an optical fiber, particularly an optical fiber incorporated in a fiber ribbon.

SUMMARY OF THE INVENTION

An object of the present invention is to offer a method of and an apparatus for expanding the mode field diameter of an optical fiber by heating a specified region of the optical fiber with a desired temperature distribution.

According to the present invention, the foregoing object is attained by offering a method of expanding the mode field diameter of an optical fiber by heating the optical fiber with a burner so as to thermally diffuse the dopant forming the refractive-index profile. The burner to be used in the foregoing method has a heating surface in which a plurality of gas-issuing holes are two-dimensionally arranged.

According to one aspect of the present invention, the foregoing object is attained by offering an apparatus for expanding the mode field diameter of an optical fiber by heating the optical fiber with a burner so as to thermally diffuse the dopant of forming the refractive-index profile. The burner to be used in the foregoing apparatus has a heating surface in which a plurality of gas-issuing holes are two-dimensionally arranged.

The gas-issuing holes may be two-dimensionally arranged such that a plurality of parallel rows each of which is composed of a plurality of gas-issuing holes are parallel to the axis of the optical fiber.

In the above description, although the expression "gas-issuing holes are two-dimensionally arranged" is used, the arrangement of the gas-issuing holes are not limited to the arrangement on the same plane. The expression means that when viewed from the gas-issuing side, the gas-issuing holes are two-dimensionally arranged without regard to their height from a reference plane. More specifically, the heating surface may comprise a plurality of planes with different heights. The heating surface may also have a curved surface. These are examples in which the gas-issuing holes do not have uniform height.

The present invention is further explained below by referring to the accompanying drawings. The drawings are provided solely for the purpose of illustration and are not intended to limit the scope of the invention.

BRIEF DESCRIPTION OF THE DRAWING

FIGS. 1A to 1C are diagrams illustrating the first embodiment of the present invention, in which FIG. 1A is a side view and FIGS. 1B and 1C are perspective views.

FIGS. 2A to 2C are diagrams showing an example of a burner to be used in the present invention, in which FIG. 2A is a plan view, FIG. 2B is an a-a section in FIG. 2A, and FIG. 2C is a right side view.

FIGS. 3A1, 3A2, and 3B are diagrams showing an example of forming a TEC or TECs in one or two optical fibers, in which FIG. 3A1 is a side view, FIG. 3A2 is a cross-sectional view, and FIG. 3B is a graph showing a relationship between the heating temperature and the location along the axis of the optical fiber.

FIGS. 4A, 4B, 4C1, 4C2, and 4C3 are diagrams showing examples of other burners, in which FIGS. 4A, 4B, and 4C1 are plan views, and FIGS. 4C2 and 4C3 are side views of the burner shown in FIG. 4C1.

FIGS. 5A and 5B are diagrams showing an example of forming TECs in three or more optical fibers or in a fiber ribbon, in which FIG. 5A is a cross-sectional view and FIG. 5B is a graph showing a relationship between the heating temperature and the location of the arranged optical fibers.

FIGS. 6A, 6B, 6C1, 6C2, and 6C3 are diagrams showing examples of other burners, in which FIGS. 6A, 6B, and 6C1 are plan views, and FIGS. 6C2 and 6C3 are front views of the burner shown in FIG. 6C1.

FIGS. 12A1 to 12B2 are diagrams illustrating conventional methods of expanding the mode field diameter.

DETAILED DESCRIPTION OF THE INVENTION

Figure 1A:
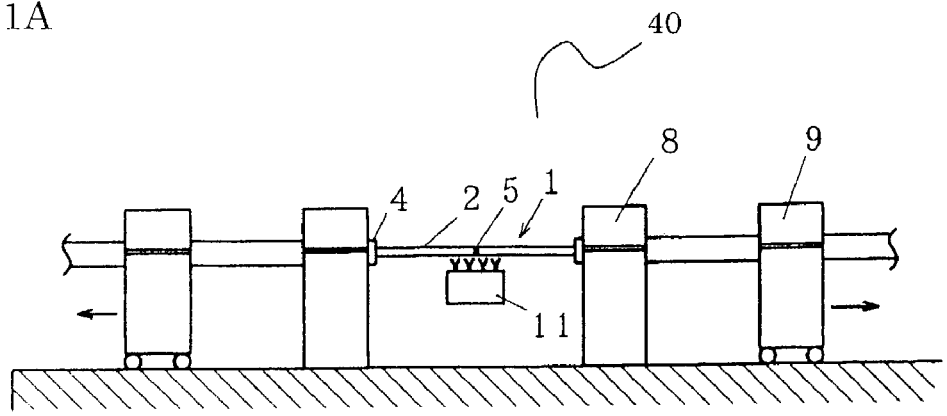

Embodiments of the present invention are explained below by referring to the accompanying drawings. In the drawings, the same number refers to the same part to avoid duplicated explanation. The ratios of the dimensions in the drawings do not necessarily coincide with the explanation.

Figure 1B:
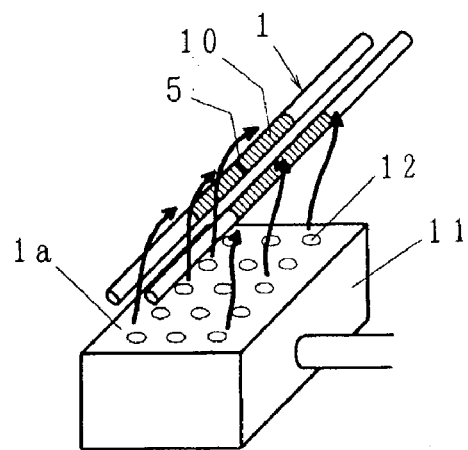
Figure 1C:
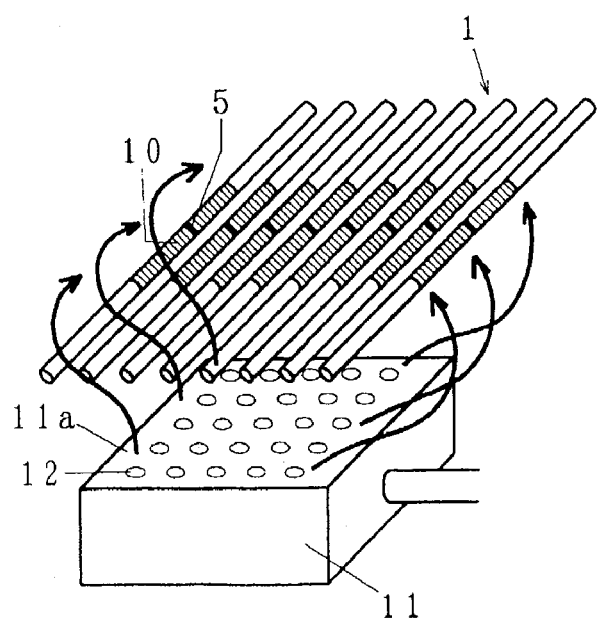

The first embodiment of the present invention is explained by referring to FIGS. 1A to 1C. FIG. 1A is a side view illustrating the outline of the heating method for forming a TEC. FIG. 1B is a perspective view illustrating the concurrent heating of two optical fibers. FIG. 1C is a perspective view illustrating the concurrent heating of three or more optical fibers in a fiber ribbon. In FIG. 1A, the numeral "2" denotes a cladding portion, whose diameter is usually 0.125 mm and in some case 0.080 mm.

As shown in FIG. 1A, after fusion-spliced, for example, an optical fiber 1 is mounted on a mode field diameter-expanding apparatus 40 to form a TEC at a fusion-spliced portion 5. The apparatus 40 is equipped with two fiber holders 8, two fiber clamps 9, and a burner 11. First, the optical fiber 1 is firmly held by the fiber clamps 9 situated at both sides of the fusion-spliced portion 5 such that the fusion-spliced portion 5 is located directly above the center of the burner 11. The burner 11 is placed such that a heating surface 11a faces the optical fiber 1. After the fiber clamps 9 give the optical fiber 1 proper tension, the fiber holders 8 located inside the fiber clamps 9 firmly hold the end portions of jackets 4 of the optical fiber 1 without releasing the tension. Subsequently, the fiber clamps 9 release the tension. The tension given to the optical fiber 1 can prevent it from sagging during the heating operation.

The method of the present invention for expanding the mode field diameter to form a TEC can be applied to both the TEC formation after the fusion-splicing as shown in FIG. 12A1 and the TEC formation before the fusion-splicing as shown in FIG. 12B1. Furthermore, the method can be applied to both one optical fiber and a fiber ribbon as can be seen from FIGS. 1A to 1C.

As shown in FIGS. 1B and 1C, the burner 11 has the heating surface 11a in which a plurality of gas-issuing holes 12 are two-dimensionally arranged such that a plurality of parallel rows each of which is composed of a plurality of gas-issuing holes are parallel to the axes of the optical fibers. The number and intervals of gas-issuing holes 12 parallel to the axes of the optical fibers 1 can be determined by considering the length of specified heating regions 10 of the optical fibers 1. The number of rows of gas-issuing holes 12 parallel to the axes of the optical fibers 1 can be adjusted in accordance with the number of optical fibers to be heated and the placing intervals of the optical fibers. In addition, a desired temperature distribution can be achieved by adjusting the arranging pattern of the multiple gas-issuing holes 12.

As shown in FIG. 1B, when the number of optical fibers to be heated is small, such as one or two, the flames of the burner 11 heat the specified heating regions 10 of the optical fibers 1 from both within and without of the array of the optical fibers 1. The heating regions 10 can be nearly uniformly heated with the multiple gas-issuing holes 12 without moving the burner 11 along the axes of the optical fibers 1. Thus, this method can expand the mode field diameter without increasing the wavelength dependency of the splice loss.

As shown in FIG. 1C, even when the number of optical fibers to be heated is large, such as three or more as in a fiber ribbon, as with the case shown in FIG. 1B, the heating regions 10 of the individual optical fibers 1 can be nearly uniformly heated with the multiple gas-issuing holes 12 without moving the burner 11 along the axes of the optical fibers 1. Thus, this method can uniformly expand the mode field diameters of all the multiple optical fibers.

As described above, whether one optical fiber or a fiber ribbon, the heating by using the multiple gas-issuing holes 12 provided on the heating surface 11a can achieve a uniform or desired temperature distribution over a wide range of a specified region of the optical fibers without moving the burner. This method can expand the mode field diameter in a short heating time in comparison with the conventional method in which the specified region is heated by moving the burner along the axes of the optical fibers. As described below the heating can be performed more uniformly by oscillating the burner 11 in the axial direction of or the arranged direction of the optical fibers by using an actuating mechanism.

Figure 2A:
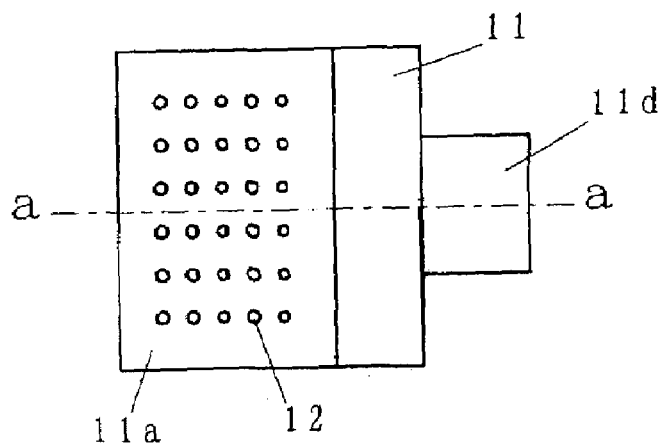
Figure 2B:
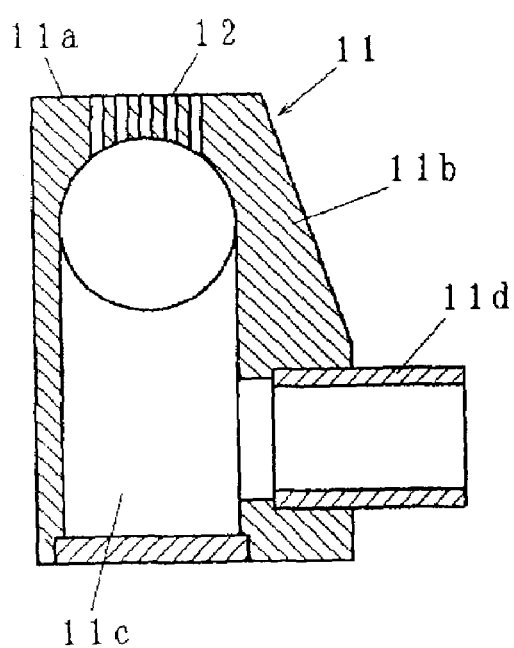
Figure 2C:
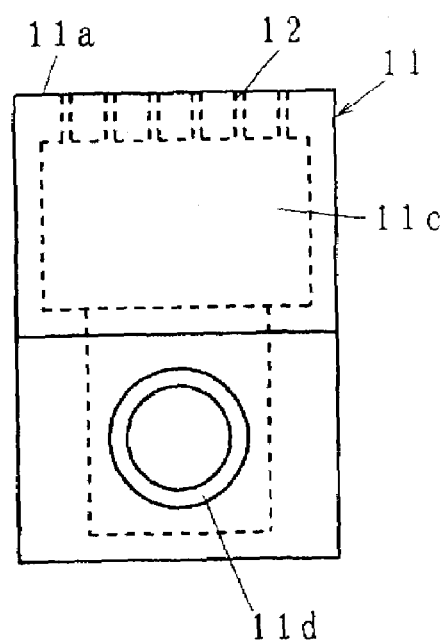

FIGS. 2A to 2C are diagrams showing an example of a burner to be used in the present invention. FIG. 2A is a plan view, FIG. 2B is an a-a section in FIG. 2A, and FIG. 2C is a right side view. A burner 11 is made of heat-resistant metal, has the shape of a rectangular solid 1 cm³ or less in volume, and has a main body 11b to which a gas-introducing pipe 11d is connected. The main body 11b has a gas-introducing chamber 11c in it and a heating surface 11a for heating optical fibers. The heating surface 11a is provided with a plurality of gas-issuing holes 12 connected to the gas-introducing chamber 11c. The gas-issuing holes 12 have a diameter of 0.3 mm or so, for example, and are arranged in the form of a matrix with the rows parallel to the axes of the optical fibers and the columns perpendicular to the axes with a pitch of 0.7 to 1.0 mm or so for both the rows and the columns.

FIGS. 3A1, 3A2, and 3B are diagrams showing an example of forming a TEC or TECs in one or two optical fibers. FIGS. 3A1 and 3A2 are a side view and a cross-sectional view, respectively, showing the heating state of the optical fiber. FIG. 3B is a graph showing a relationship between the heating temperature and the location along the axis of the optical fiber. FIGS. 4A, 4B, and 4C1 are plan views showing examples of other burner configurations, and FIGS. 4C2 and 4C3 are side views of the burner shown in FIG. 4C1.

As shown in FIGS. 3A1 and 3A2, when the number of optical fibers to be heated is small, such as one or two, it is not necessary to consider variations in the heating conditions between the optical fibers, which variations occur in the case of a fiber ribbon. However, as shown by a curve denoted by f in FIG. 3B, the optical fiber is heated more intensely at the central portion of the burner than at the end portions. To form a TEC uniformly in the specified region of the optical fiber, it is desirable that the distribution of the heating temperature be relatively flat as shown by a curve denoted by h in FIG. 3B.

FIGS. 4A, 4B, and 4C1 show examples of burner configurations suitable for achieving a flat temperature distribution. FIG. 4A shows a burner in which the gas-issuing holes 12b at the portions close to the burner's side faces perpendicular to the axis of the optical fiber have a larger cross-sectional area than the gas-issuing holes 12a at and around the midpoint portion between the burner's foregoing side faces.

FIG. 4B shows a burner in which the number of gas-issuing holes 12b close to the burner's side faces perpendicular to the axis of the optical fiber is larger than the number of gas-issuing holes 12a at and around the midpoint portion between the burner's foregoing side faces. In other words, the gas-issuing holes 12b at the portions close to the burner's foregoing side faces are more densely arranged than the gas-issuing holes 12a at and around the midpoint portion between the burner's foregoing side faces.

FIGS. 4C1 to 4C3 show burners in which the distance between the heating surface 11a and the optical fiber 1 is smaller at the portions close to the burner's side faces perpendicular to the axis of the optical fiber than at and around the midpoint portion between the burner's foregoing side faces. More specifically, the burner shown in FIG. 4C2 has a heating surface 11a with a recess 11e at the midpoint portion between the burner's foregoing side faces, and the burner shown in FIG. 4C3 has a heating surface 11a with a recess 11e formed by two planes that inwardly incline toward the midpoint portion between the burner's foregoing side faces. In the burners shown in FIGS. 4A, 4B, and 4C1, the heating amount is larger at the portions close to the burner's foregoing side faces than at and around the midpoint portion.

FIGS. 5A and 5B and FIGS. 6A, 6B, 6C1, 6C2, and 6C3 are diagrams showing examples of forming TECs in three or more optical fibers or in a fiber ribbon. FIG. 5A is a cross-sectional view showing a heating state of the optical fibers, and FIG. 5B is a graph showing a relationship between the heating temperature and the location of the arranged optical fibers. FIGS. 6A, 6B, and 6C1 are plan views showing examples of other burner configurations, and FIGS. 6C2 and 6C3 are front views of the burner shown in FIG. 6C1.

When TECs are formed in three or more optical fibers or in a fiber ribbon, as shown in FIG. 5A, the flames of the burner bend from the inner side to the outer side of the fiber array. Consequently, the optical fibers placed at the outer side are more intensely heated than those placed at the inner side. As shown by a curve denoted by f in FIG. 5B, the amount of heating is dependent on the location of the arranged optical fibers. The heating temperature of the optical fibers placed at the outer side is higher than that of the optical fibers placed at the inner side. To form TECs uniformly in a plurality of optical fibers 1, it is desirable that the distribution of the heating temperature be relatively flat as shown by a curve denoted by h in FIG. 5B.

FIGS. 6A, 6B, and 6C1 show examples of the burner configurations suitable for achieving the foregoing relatively flat temperature distribution. They are structured such that the heating amount is smaller at the portions close to the burner's side faces parallel to the axes of the optical fibers than at and around the midpoint portion between the burner's foregoing side faces. FIG. 6A shows a burner in which the gas-issuing holes 12b at the portions close to the burner's side faces parallel to the axes of the optical fibers have a smaller cross-sectional area than the gas-issuing holes 12a at and around the midpoint portion between the burner's foregoing side faces.

FIG. 6B shows a burner in which the number of gas-issuing holes 12b at the portions close to the burner's side faces parallel to the axes of the optical of a plurality of gas-issuing holes are parallel to the axes of the optical fibers is smaller than the number of gas-issuing holes 12a at and around the midpoint portion between the burner's foregoing side faces. In other words, the gas-issuing holes 12b are more sparsely arranged than the gas-issuing holes 12a.

FIGS. 6C1 to 6C3 show burners in which the distance between the heating surface 11a and the optical fibers 1 is larger at the portions close to the burner's side faces parallel to the axes of the optical fibers than at and around the midpoint portion between the burner's foregoing side faces. More specifically, the burner shown in FIG. 6C2 has a heating surface 11a with a protruding portion 11f at the midpoint portion between the burner's foregoing side faces, and the burner shown in FIG. 6C3 has a heating surface 11a with a protruding portion 11f formed by two planes that outwardly incline toward the midpoint portion between the burner's foregoing side faces. In the burners shown in FIGS. 6A, 6B, and 6C1, the heating amount is smaller at the portions close to the burner's foregoing side faces than at and around the midpoint portion.

In the burners shown in FIGS. 6A, 6B, and 6C1, a plurality of gas-issuing holes are arranged such that a plurality of parallel rows each of which is composed of a plurality of gas-issuing holes are parallel to the axes of the optical fibers. The present invention, however, is not limited to the above-described structure. The gas-issuing holes have only to be arranged two dimensionally so that a specified heating region can be properly heated.

Figure 7:
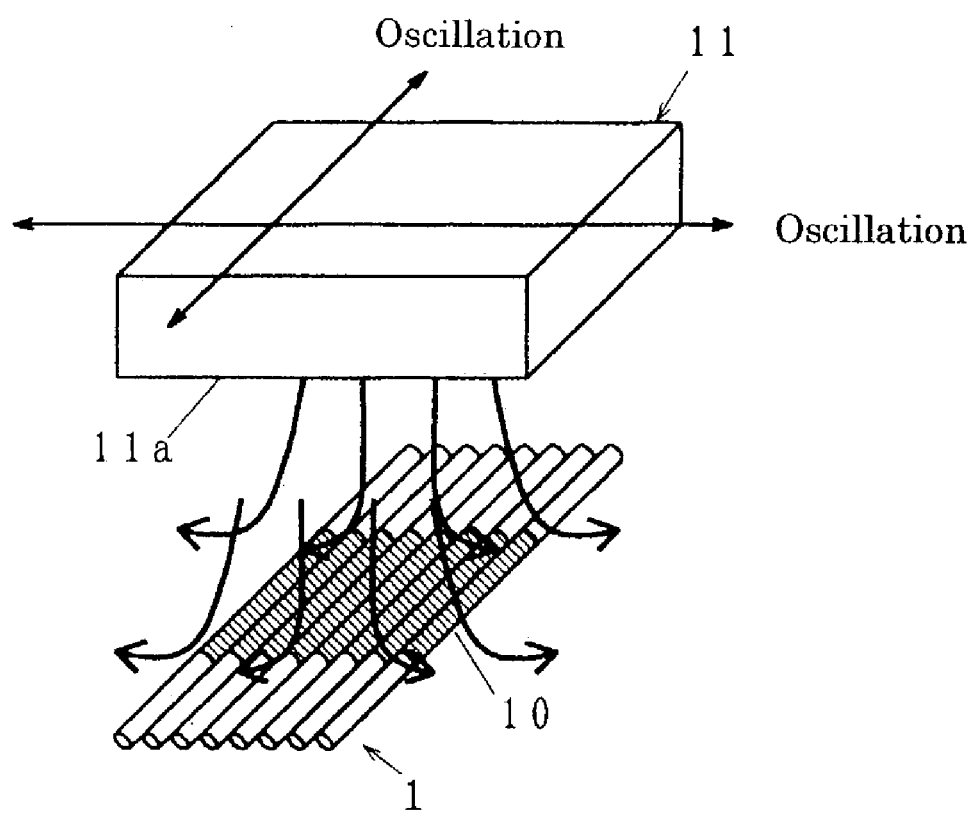
FIG. 7 is a perspective view illustrating the second embodiment of the present invention.

FIG. 7 is a diagram illustrating the second embodiment of the present invention. In this embodiment, a burner 11 is placed directly above optical fibers 1 with its heating surface 11a facing downward to heat the optical fibers. The burner 11 may have the same configuration and structure as shown in FIGS. 1B, 1C, 2A, 4A, 4B, 4C1, 6A, 6B, or 6C1.

The second embodiment, also, can uniformly heat a specified region of the optical fibers 1. With the second embodiment, as shown in FIG. 7, the flames of the burner first reach the optical fibers 1 to heat them directly, and then shift direction upward. Consequently, the phenomenon as shown in FIG. 5A can be avoided in which the flumes bend from the inner side to the outer side in the array of the optical fibers 1 so as to encompass the optical fibers. As a result, this embodiment prevents the occurrence of the state in which the optical fibers placed at the outer side in the array are more intensely heated than those placed at the inner side.

The heating with the burner 11 facing downward can improve the phenomenon that the optical fiber is heated more intensely at the central portion of the burner than at the end portion, which is explained by referring to FIG. 3B. Therefore, the method employed in the second embodiment is advantageous in that one or two optical fibers, also, can be heated more uniformly.

It is desirable to oscillate the burner 11 in the arrayed and axial directions of the optical fibers. The amplitude of the oscillation has no particular limitations. For example, a fiber ribbon comprising eight fibers has a width of 2.0 mm or so. Therefore, an amplitude of about 2.0 mm may be employed. The oscillation of the burner 11 can enhance the uniformity of the heating of all optical fibers, and, in particular, the oscillation in the axial direction of the optical fibers can uniformly extend the heating region.

It is desirable that the formation of a TEC by the method of the present invention be applied to the fusion-spliced portion 5 between different types of optical fibers 1a and 1b as shown in FIGS. 12A1 to 12B2. When the method of the present invention is applied, the fusion-spliced portion 5 can be heated to satisfactorily expand the mode field diameter, and consequently the increase in splice loss can be minimized.

Figure 8:
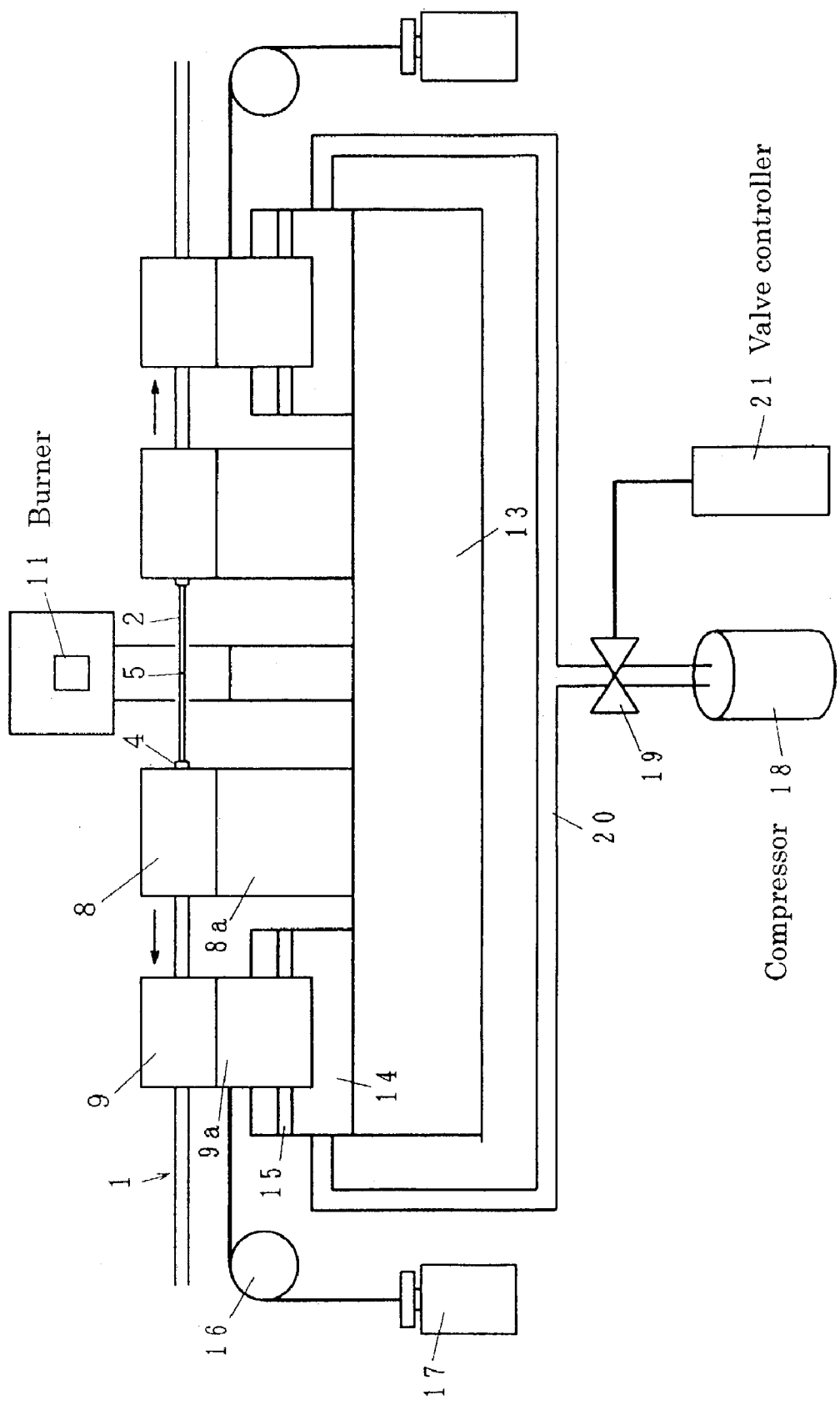
FIG. 8 is a diagram illustrating an optical fiber-supporting mechanism of the present invention.
Figure 9:
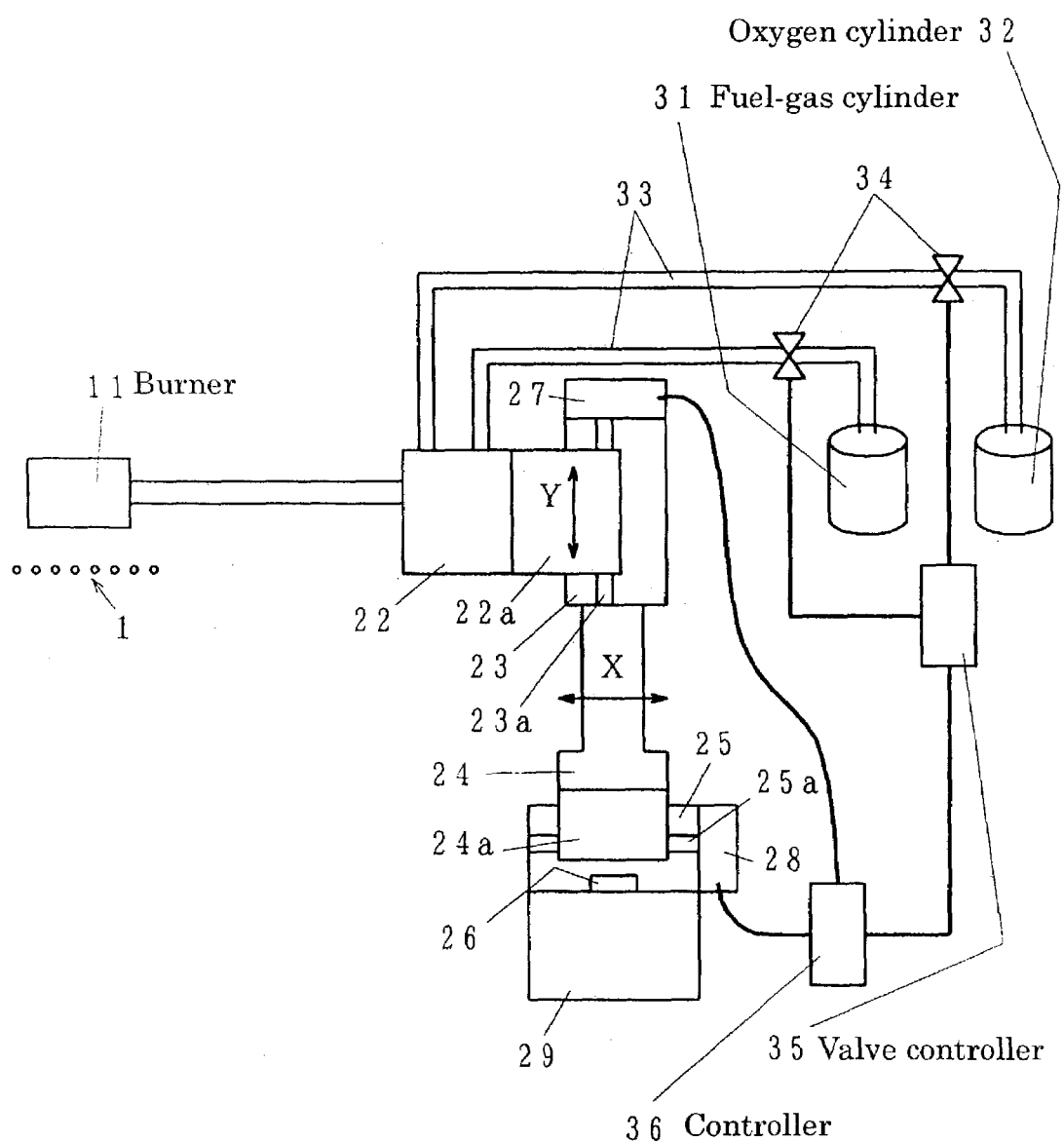
FIG. 9 is a diagram illustrating a burner-actuating mechanism of the present invention.
Figure 10:
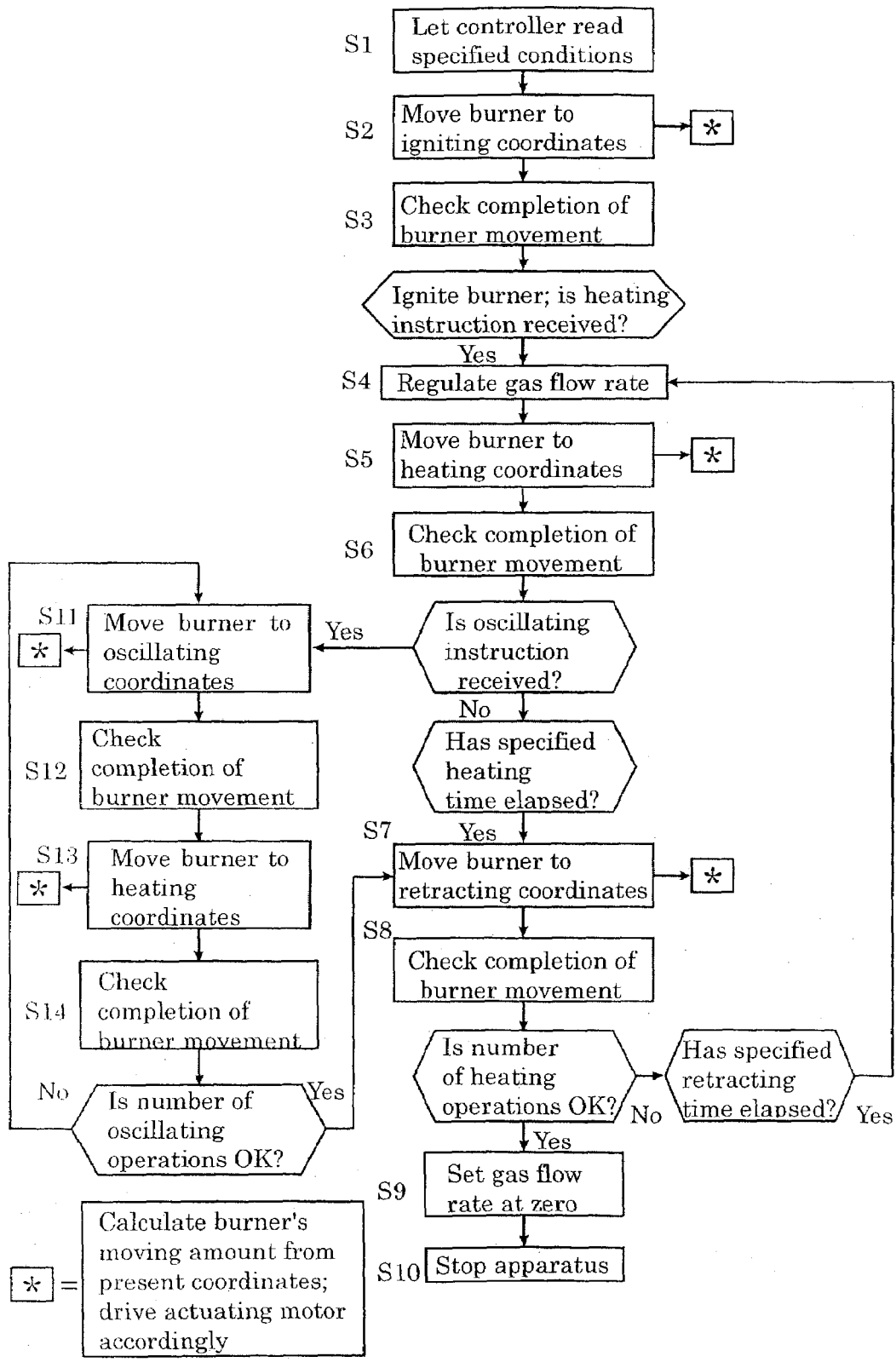
FIG. 10 is a flow chart showing the operation of a burner of the present invention.

Next, an apparatus for expanding the mode field diameter offered by the present invention is specifically explained together with its actuating mechanism and operating method by referring to FIGS. 8 to 10. FIG. 8 shows an optical fiber-supporting mechanism, FIG. 9 a burner-actuating mechanism, and FIG. 10 an operating flow of a burner.

As shown in FIG. 8, an optical fiber 1 is firmly held by fiber clamps 9 situated at both sides of a fusion-spliced portion 5 at which a TEC is to be formed such that the fusion-spliced portion 5 is located directly under a burner 11. The fiber clamps 9 are mounted on fiber clamp stands 9a that can slide along sliding grooves 15 on sliding platforms 14 installed on a base 13. The fiber clamp stands 9a are pulled outward with pulleys 16 and weights 17, and the fiber clamp stands 9a's movement on the sliding platforms 14 is controlled pneumatically. The air for the control is supplied from a compressor 18 via an air valve 19 and a pipe arrangement 20. A valve controller 21 regulates the air supply by controlling the air valve 19.

First, the optical fiber 1 is firmly held by the fiber clamps 9 situated at both sides of the fusion-spliced portion 5. Second, the fiber clamp stands 9a are allowed to move freely. This causes the weights 17 to apply tension to the optical fiber 1. Third, without releasing this tension, fiber holders 8 mounted on fiber holder stands 8a firmly hold the end portions of the jacket 4 of the optical fiber 1. Finally, the valve controller 21 releases the tension applied to the optical fiber 1.

After the optical fiber 1 is in position as described above, the position of the burner 11 is adjusted to start the heating as described below. As shown in FIG. 9, the burner 11 is supported by a burner supporter 22 mounted on a burner supporter stand 22a. An actuating motor 27 is provided to move the burner supporter stand 22a up and down (as shown by a double-headed arrow denoted by Y) along a sliding groove 23a on a up-and-down motion platform 23. The up-and-down motion platform 23 is supported by a supporting arm 24 mounted on a supporting arm stand 24a. An actuating motor 28 is provided to move the supporting arm stand 24a back and forth (as shown by a double-headed arrow denoted by X) along a sliding groove 25a on a back-and-forth motion platform 25.

Yet another actuating motor (not shown in FIG. 9) is provided to move the back-and-forth motion platform 25 laterally (in a direction perpendicular to the face of the paper) along a guide portion 26 on a base 29.

Combustion gas is supplied to the burner 11 through the burner supporter 22. The gas is a mixed gas of oxygen and fuel gas such as propane, acetylene, or hydrogen. These gases are supplied from a fuel-gas cylinder 31 and an oxygen cylinder 32 through a pipe arrangement 33. A valve controller 35 controls gas-flow-regulating valves 34 to supply required amounts of these gases. A computerized controller 36 controls the valve controller 35, the actuating motors 27 and 28, and the anonymous actuating motor.

Next, the operation of the above-described mechanism is explained by referring to the operating flow of the burner shown in FIG. 10. In Step S1, specified conditions are entered or read into the controller 36. In Step S2, an instruction is issued to move the burner to an igniting position. In Step S3, the movement of the burner to the igniting position designated by coordinates is completed. Then, the burner is ignited, and an instruction is issued to start the heating.

After the burner is ignited, in Step S4, the flow rate of the gas to be supplied to the burner is regulated to a specified amount in accordance with the specified conditions entered into the controller 36. In Step S5, an instruction is issued to move the burner to a heating position. Then, a calculation is conducted to obtain the amount of movement of the burner from the present position to the heating position designated by coordinates. Subsequently, the actuating motor moves the burner to the heating coordinates.

In Step S6, the movement of the burner to the heating coordinates is completed. Then, whether or not the burner is to be oscillated is selected. When the specified condition is "No," the optical fiber is heated for a specified time according to the specified conditions. In Step S7, an instruction is issued to move the burner to a retracting position. Then, a calculation is conducted to obtain the amount of movement of the burner from the present position to the retracting position designated by coordinates. Subsequently, the actuating motor moves the burner to the retracting coordinates.

After Step S6, when the specified condition for the burner oscillation is "Yes," Step S11 moves the burner to an oscillating position designated by coordinates, and this movement is completed in Step S12. Then, Step S13 moves the burner to the original heating coordinates, and this movement is completed in Step S14. This cycle is repeated until the number of burner-oscillating operations meets the specified condition. After the completion of this repetition, the next step is Step 7. As described above, in Step S7, an instruction is issued to move the burner to the retracting coordinates, and the burner is moved accordingly.

In Step S8, the movement of the burner to the retracting coordinates is completed. When the number of heating operations satisfies the specified condition. Step S9 sets the gas flow rate to the burner at zero. In Step 10, the apparatus completes the operation and stops. After Step S8, if the number of heating operations does not satisfy the specified condition, the process returns to Step S4 after a specified retracting time elapses. Subsequently, the heating is started again to repeat the foregoing cycle until the number of heating operations satisfies the specified condition.

Figure 11:
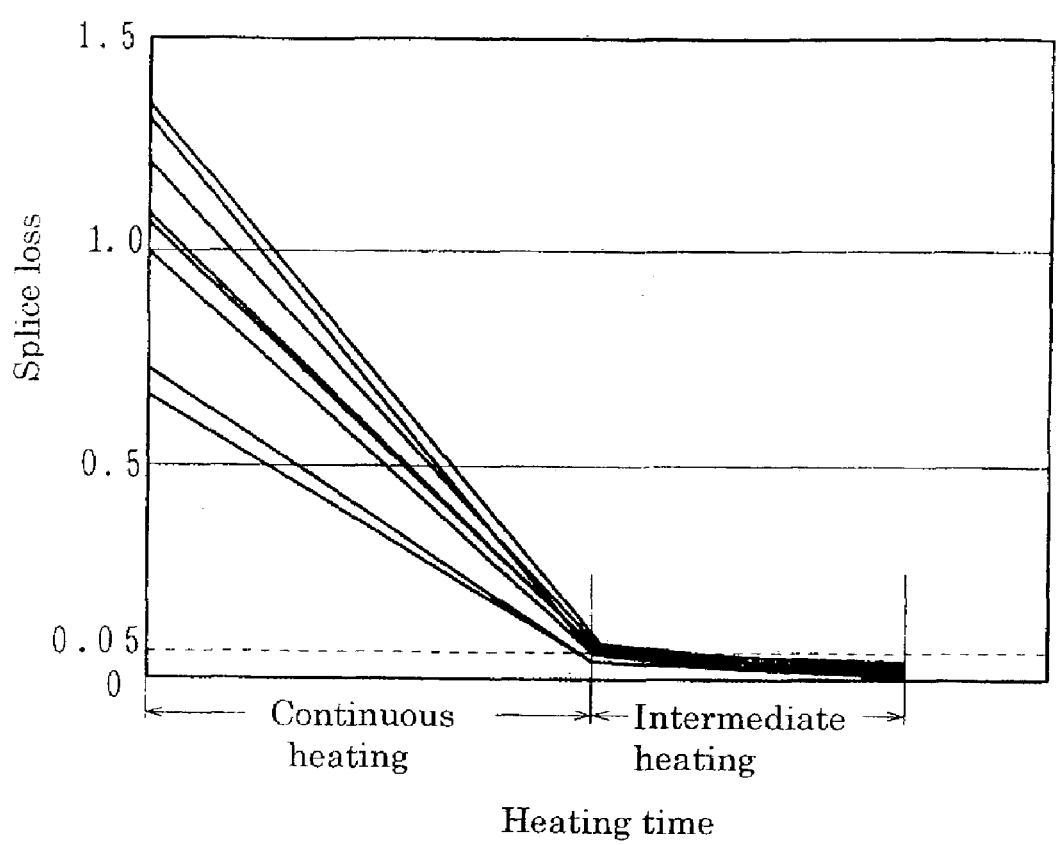
FIG. 11 is a graph showing a relationship between the splice loss and the heating time in a method of expanding the mode field diameter of the present invention.

FIG. 11 is a graph showing splice losses of individual optical fibers when TECs are formed according to the method of the present invention after multiple optical fibers are concurrently fusion-spliced between a fiber ribbon comprising eight ordinary single-mode optical fibers having a mode field diameter of about 10 μm and a fiber ribbon comprising eight optical fibers having a mode field diameter of about 5 μm at the wavelength of 1.55 μm respectively. The burner used had gas-issuing holes arranged in five rows and six columns. The optical fibers were heated with the heating surface of the burner facing downward as shown in FIG. 7. The heating was conducted such that after the continuous heating for a specified time, intermittent heating with short heating times was performed. The splice loss was monitored continuously at a wavelength of 1.55 μm.

As can be seen from FIG. 11, the initial values of splice losses of the fusion-spliced portions had considerable variations within the group of optical fibers (the minimum splice loss was 0.65 dB and the maximum splice loss was 1.35 dB). This is attributable to various factors affecting the concurrent multiple fusion-splicing, such as a difference in the cutting angle at the splicing end face between the optical fibers, a difference in the end face-to-end face distance between the optical fibers, and a difference in the heating amount between an optical fiber at an outer location in the array and an optical fiber at an inner location. Nevertheless, after the formation of the TECs proceeded by the heating for a specified time, the variations of splice losses of the optical fibers decreased, and the splice losses of individual optical fibers were reduced to about 0.05 dB, which is comparable to the splice loss attainable when two ordinary single-mode optical fibers are spliced.

As described above, the splice losses decreased with increasing heating time, and after a certain period of time, the amount of the decrease in splice loss became small. Immediately after the splice losses decreased to a certain degree, the spliced portions were heated intermittently with repetition of short heating times. As a result, the splice losses decreased finally to less than 0.05 dB, which value causes no problem in actual use.

Figure 13:
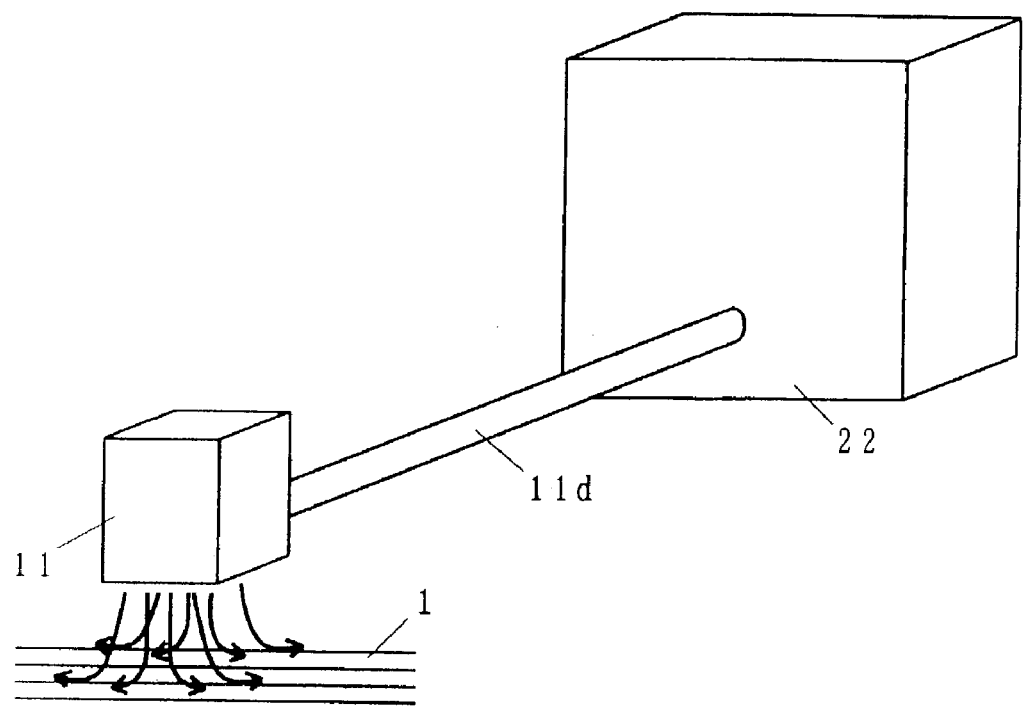
FIG. 13 is a perspective view illustrating the heating of optical fibers from above with a burner facing downward.

As explained in the foregoing embodiments, in the present invention, optical fibers are heated with a burner. Because a mixed gas of fuel gas and oxygen burns at the heating surface of the burner, this combustion also heats the burner itself. In particular, as shown in FIG. 13, when a burner 11 facing downward heats optical fibers 1 from above, the burner 11 is heated considerably by the flames. If the temperature of the burner 11 becomes high, the heating surface deforms, and the size of the gas-issuing holes changes. As a result, the heating conditions deviate from the specified limits, and the desired expansion of the mode field diameter cannot be achieved. The temperature may rise until the burner 11 is red-hot. This red-hot condition may disconnect the brazed connection between the burner 11 and a gas-introducing pipe 11d. If not disconnected, the position of the burner 11 may shift.

Figure 14:
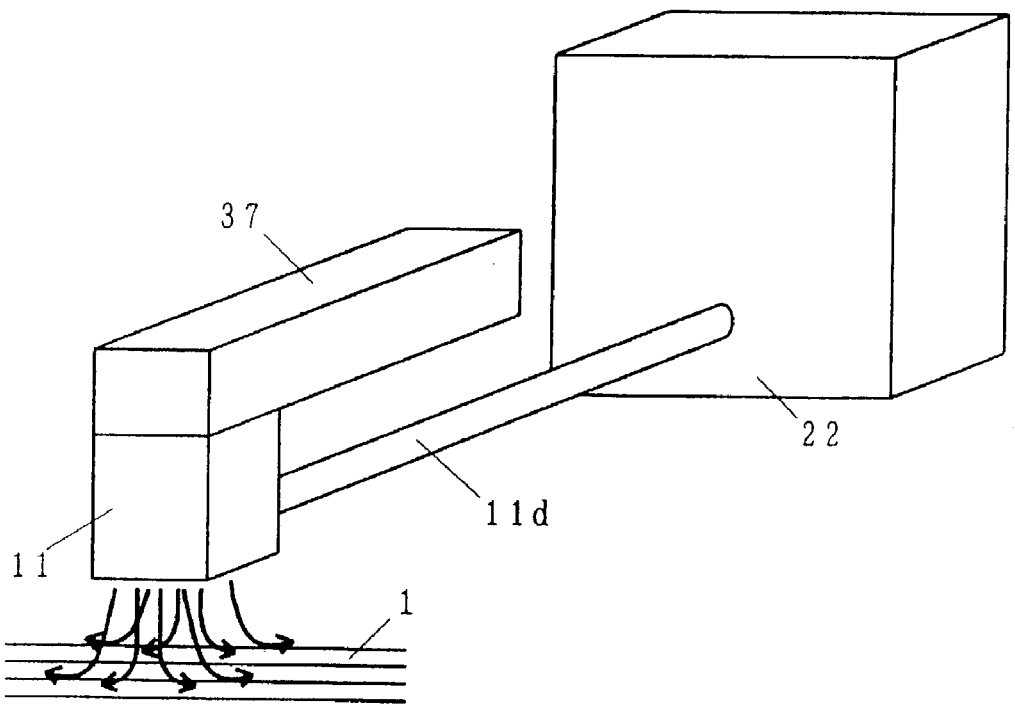
FIG. 14 is a perspective view illustrating an embodiment in which a passive cooling means is employed.

FIG. 14 is a diagram illustrating an example of an embodiment in which a cooling means is employed to prevent a burner from being overheated. In this embodiment, a passive cooling means is employed. More specifically, a radiator 37 is attached to the top face of the burner 11 to cool it naturally. The radiator 37 is made of a material having high thermal conductivity, such as metal. It is connected to the burner 11 in a manner that reduces the thermal resistance between the two members. In FIG. 14, the radiator 37 is illustrated as a block. Of course, a metal block may be used as a radiator. Radiating fins may also be formed to increase the heat-dissipating surface area. The radiator 37 can dissipate the heat generated by the burner 11 when the burner 11 heats the optical fibers 1, so that an excessive temperature rise in the burner 11 can be suppressed. When the burner 11 is formed by using a metallic material, the burner 11 and the radiator 37 may be formed as a unitary structure.

Figure 15:
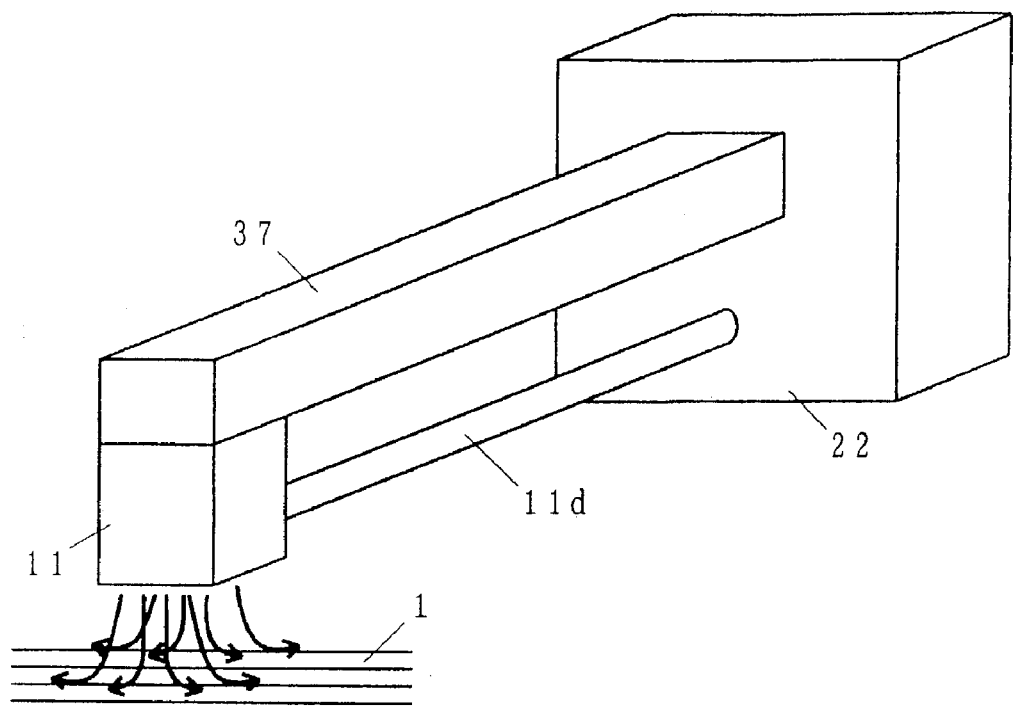
FIG. 15 is a perspective view illustrating another embodiment in which a passive cooling means is employed.

FIG. 15 is a diagram illustrating an embodiment in which the radiator 37 shown in FIG. 14 is lengthened so that it can be connected to the burner supporter 22. In this embodiment, also, a passive cooling means is employed. The radiator 37 may be formed by using a metal block. Radiating fins may also be formed to increase the heat-dissipating surface area. In comparison with the embodiment illustrated in FIG. 14, the burner 11 can be more firmly supported by both the gas-introducing pipe lid and the radiator 37. In this embodiment, when the burner supporter 22, particularly its casing, is formed by using a material having high thermal conductivity, such as metal, to allow the radiator 37 to be connected thermally as well, the burner supporter 22 can also function as a heat-dissipating member to increase the effect of heat dissipation.

Figure 16:
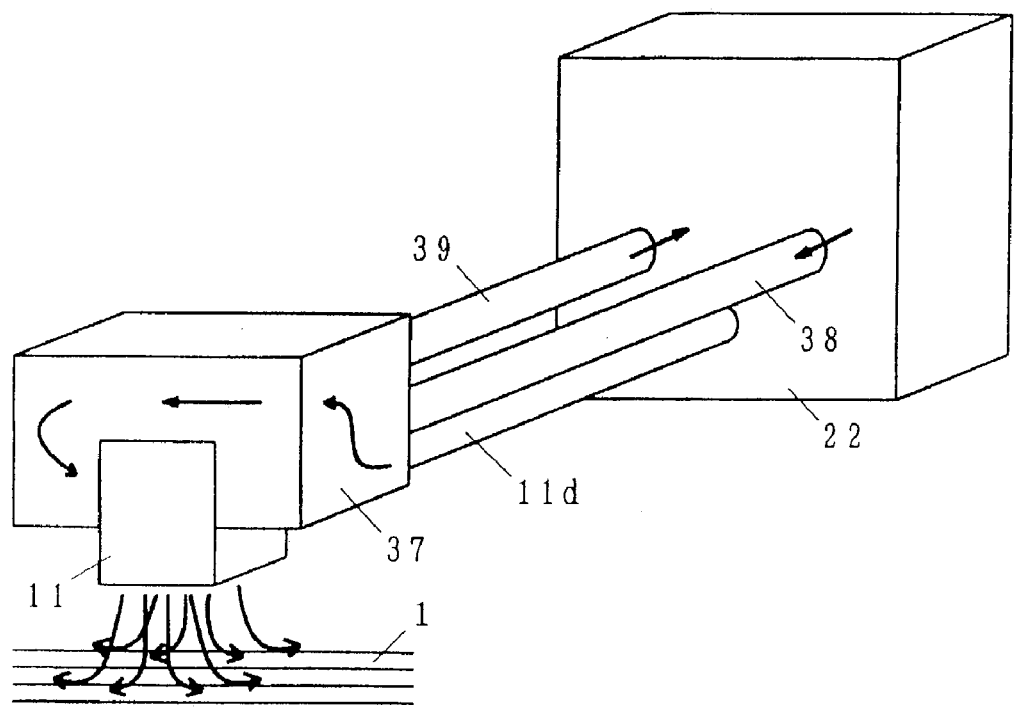
FIG. 16 is a perspective view illustrating an embodiment in which an active cooling means is employed.

FIG. 16 is a diagram illustrating an example of an embodiment in which an active cooling means is employed. In this embodiment, the radiator 37 is provided with a forced cooling means in which a coolant such as water is circulated. Although the following example uses water as the coolant, the present invention is not limited to the use of water.

The radiator 37 is provided with a duct through which water can flow. The duct can be formed without specific limitations. It may be formed by drilling a hole in the block of the radiator 37. Alternatively, a single cavity may be termed with surrounding walls. Any method may be employed providing that the heat transferred to the radiator 37 from the burner 11 can be absorbed by the water flowing in the nearly entire portion of the radiator 37. The burner supporter 22 is equipped with a water-cooling device that has a water-feeding section for feeding cooling water and a water-draining section for receiving heated cooling water. A controller may be provided to control the amount of water to be fed. A water-feeding pipe 38 connects a water inlet of the radiator 37 and the water-feeding section of the burner supporter 22. A water-draining pipe 39 connects a water outlet of the radiator 37 and the water-draining section of the burner supporter 22. It is desirable that the water-feeding section be able to control the amount of water to be fed. Tap water may be used as the cooling water. In this case, the water-feeding section is connected to a water-supplying pipe. The heated cooling water received at the water-draining section may either be drained immediately or be returned to the water-feeding section after being cooled by passing through a radiator; the latter system is known as a circulation system. When a temperature sensor is used to monitor the temperature of the burner 11, the cooling can be performed more effectively feeding the information back to the cooling device of the burner supporter 22.

The foregoing active cooling means is not limited to a system using a coolant. A similar forced cooling can be performed by using a Peltier device, for example.

As explained above, when a cooling means is provided, the thermal power of the burner can be increased. As a result, the heating time can be shortened in comparison with a system having no cooling means, thereby improving the productivity.

Figure 17A:
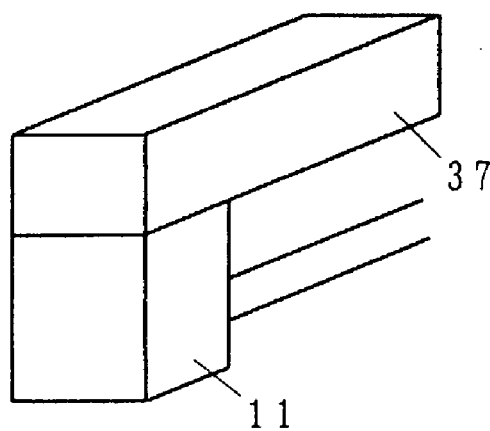
FIGS. 17A to 17C are perspective views explaining coupling methods between a burner and a radiator.
Figure 17B:
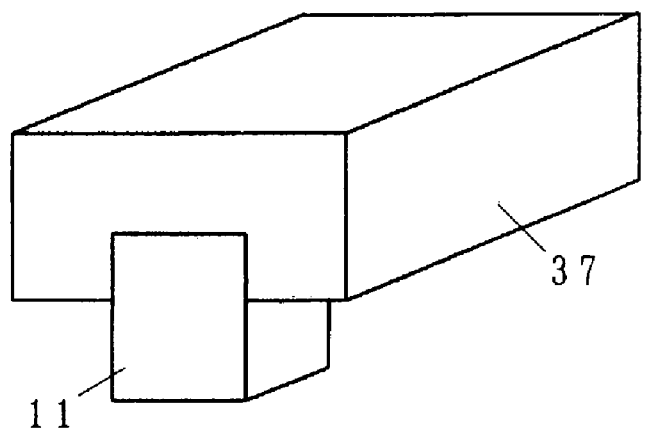
Figure 17C:
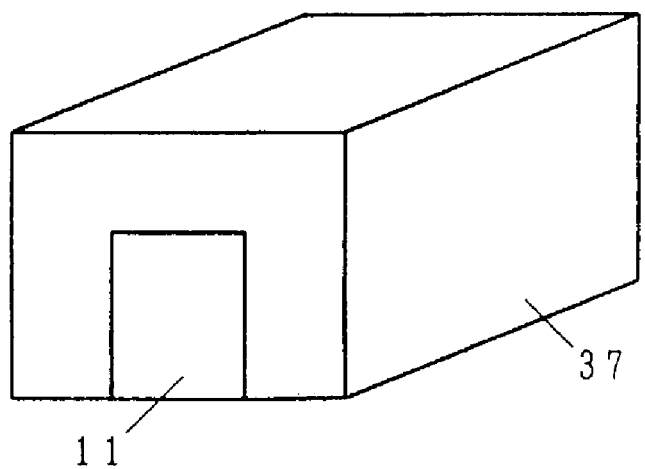

FIGS. 17A to 17C are perspective views explaining coupling methods between a burner 11 and a radiator 37. In FIG. 17A, the radiator 37 is connected only to the top face of the burner 11. In FIG. 17B, the radiator 37 is connected to the burner 11 such that the top face and part of the side faces of the burner 11 are covered by the radiator 37. In FIG. 17C, the radiator 37 is connected to the burner 11 such that the top face and the entire side faces of the burner 11 are covered by the radiator 37. In this case, part of the front face and rear face of the burner 11 may be covered by the radiator 37.

The entire disclosure of Japanese Patent Application No. 2002-328144 filed on Nov. 12, 2002 including the specification, claims, drawings, and summary are incorporated herein by reference in its entirety.

What is claimed is:

1. A method of expanding the mode field diameter of at least one optical fiber, the method expanding the mode field diameter by heating the optical fiber or fibers with a burner so as to thermally diffuse the dopant forming the refractive-index profile;

the burner having a heating surface in which a plurality of gas-issuing holes are two-dimensionally arranged, wherein the burner is placed directly above the optical fiber with the heating surface facing downward to heat the optical fiber or fibers.

2. A method as defined by claim 1, wherein the burner has a heating surface in which a plurality of gas-issuing holes are arranged such that a plurality of parallel rows each of which is composed of a plurality of gas-issuing holes are parallel to the axis of the optical fiber or fibers.

3. A method of expanding the mode field diameter of at least one optical fiber, the method expanding the mode field diameter of at least one optical fiber, the method expanding the mode field diameter by heating the optical fiber or fibers with a burner so as to thermally diffuse the dopant forming the refractive-index profile;

the burner having a heating surface in which a plurality of gas-issuing holes are two-dimensionally arranged, wherein the at least one optical fiber is one or two optical fibers, and the heating with the burner is performed such that the heating amount is larger at the portions close to the burner's side faces perpendicular to the axis of the optical fiber or fibers than at and around the midpoint portion between the side faces.

4. A method as defined by claim 3, wherein the gas-issuing holes at the portions close to the side faces have a larger cross-sectional area than the gas-issuing holes at and around the midpoint portion.

5. A method as defined by claim 3, wherein the gas-issuing holes at the portions close to the side faces are more densely arranged than the gas-issuing holes at and around the midpoint portion.

6. A method as defined by claim 3, wherein the distance between the heating surface and the optical fiber or fibers is smaller at the portions close to the side faces than at and around the midpoint portion.

7. A method of expanding the mode field diameter of at least one optical fiber, the method expanding the mode field diameter by heating the optical fiber or fibers with a burner so as to thermally diffuse the dopant forming the refractive-index profile;

the burner having a heating surface in which a plurality of gas-issuing holes are two-dimensionally arranged, wherein the at least one optical fiber is a fiber ribbon comprising three or more optical fibers arranged in a flat array, and the heating with the burner is performed such that the heating amount is smaller at the portions close to the burner's side faces parallel to the axes of the optical fibers than at and around the midpoint portion between the side faces.

8. A method as defined by claim 7, wherein the gas-issuing holes at the portions close to the side faces have a smaller cross-sectional area than the gas-issuing holes at and around the midpoint portion.

9. A method as defined by claim 7, wherein the gas-issuing holes at the portions close to the side faces are more sparsely arranged than the gas-issuing holes at and around the midpoint portion.

10. A method as defined by claim 7, wherein the distance between the heating surface and the optical fibers is larger at the portions close to the side faces than at and around the midpoint portion.

11. A method as defined by claim 1, wherein the burner is oscillated in a direction parallel to or perpendicular to the axis of the optical fiber or fibers while the burner is heating the optical fiber or fibers. the burner is heating the optical fiber or fibers.

12. A method as defined by claim 1, wherein different types of optical fibers having different mode field diameters are fusion-spliced before the optical fiber or fibers are heated.

* * * * *

UNITED STATES PATENT AND TRADEMARK OFFICE
CERTIFICATE OF CORRECTION

PATENT NO. : 7,142,771 B2  Page 1 of 1
APPLICATION NO. : 10/383751
DATED : November 28, 2006
INVENTOR(S) : Eiichiro Yamada et al.

It is certified that error appears in the above-identified patent and that said Letters Patent is hereby corrected as shown below:

Column 12, line 17, after "optical fiber" insert -- or fibers --

Column 12, line 26 and 27, after "least one optical fiber" delete "the method expanding the mode field diameter of at least one optical fiber,"

Signed and Sealed this

First Day of May, 2007

JON W. DUDAS
*Director of the United States Patent and Trademark Office*